Figure 1:
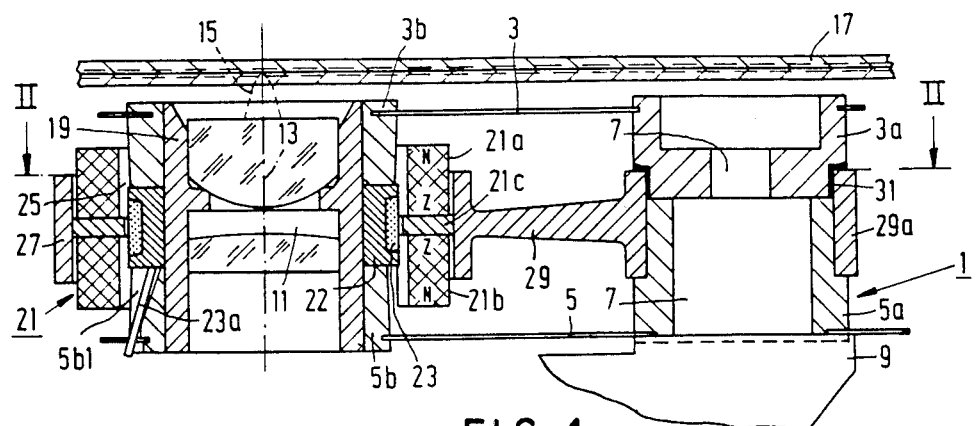

United States Patent [19]

Van Sluys et al.

[11] Patent Number: 4,615,585
[45] Date of Patent: Oct. 7, 1986

[54] OPTICAL FOCUSING DEVICE

[75] Inventors: Robert N. J. Van Sluys; Johannes J. M. Schoenmakers, both of Eindhoven, Netherlands

[73] Assignee: U.S. Philips Corporation, New York, N.Y.

[21] Appl. No.: 690,081

[22] Filed: Jan. 9, 1985

[30] Foreign Application Priority Data

Oct. 8, 1984 [NL] Netherlands ............... 8403052

[51] Int. Cl.$^4$ ............................................. G02B 7/04
[52] U.S. Cl. ................................... 350/255; 369/45
[58] Field of Search ................... 350/6.3, 247, 255; 369/44, 45

[56] References Cited

U.S. PATENT DOCUMENTS 4,475,179 10/1984 Geyer ..................... 369/45
4,557,564 10/1985 Van Rosmalen ........... 350/255
4,568,142 2/1986 Iguma .................... 350/6.3

Primary Examiner—John K. Corbin
Assistant Examiner—Loha Ben
Attorney, Agent, or Firm—David R. Treacy

[57] ABSTRACT

In an optical device an objective (11) can be moved relative to the frame (1) along its optical axis (13) in parallel guide means (3, 5) by means of an electromagnetic actuating device. The actuating device comprises first actuating means (21) and second actuating means (23) which are connected to the objective (11) and which cooperate with said first actuating means via an air gap (25). The first actuating means (21) are arranged in a mount (27) which is supported by a leaf-spring-shaped element (29) which is secured to the frame (1).

5 Claims, 2 Drawing Figures

OPTICAL FOCUSING DEVICE

The invention relates to an optical device comprising an axially movable objective with an optical axis, a frame carrying guide means for the axial movements of the objective, and an electro-magnetic actuating device for the objective, which actuating device comprises first actuating means which are supported resiliently on the frame and which are arranged concentrically around the objective, and second actuating means which are connected to the objective and which are spaced from the first actuating means by an annular gap.

Such an optical device is used in particular as a focusing device for focussing a light beam on an optical disc. An optical focussing device for an optical disc-record player is described in, for example, Netherlands Patent application No. 82 02 451 (U.S. Pat. No. 4,490,011 corresponds).

In the present Patent Application, "frame" is to be understood to mean that part of the device which serves for securing the device in an apparatus and all other parts which are rigidly connected thereto. In the known optical device the frame comprises a bearing bush in which the objective is axially slidable with clearance. The actuating system comprises a coil arranged on the objective and an annular magnet arranged around said coil. The annular magnet is secured to the frame in a resilient and damping manner by four leaf springs which are equispaced about the optical axis and by eight rubber rings which cooperate therewith. This construction serves to damp the axial forces exerted on the frame by the annular magnet under operating conditions. These axial forces may be produced when the objective is required to be moved fairly rapidly along its optical axis. The magnetic forces which are then exerted on the coil by the annular magnet via the air gap may be substantial. Consequently, the reactive forces exerted on the annular magnets may be of such a magnitude that the frame is subject to mechanical vibrations which are transmitted to the apparatus in which the optical device is mounted.

A disadvantage of the known device is in particular the rather intricate manner in which the annular magnet is secured to the frame. Moreover, the frame is comparatively large because it requires a plurality of leaf springs which are equispaced about the optical axis in order to obtain a symmetrical damping.

The invention aims at improving an optical device of the type defined in the opening paragraph in such a way that it is simpler and cheaper and the frame has a more slender shape.

To this end the invention is characterized in that the first actuating means are arranged in an annular mount which is secured to the frame by a leaf-spring-shaped damping element.

This enables the first actuating means to be mounted by means of a resilient and damping arrangement which is light in weight and of which at least the transverse dimension is small. Moreover, a suspension can be obtained which is comparatively flexible in the axial direction but which is stiff in directions transverse thereto, in particular in the longitudinal and the transverse direction of the leaf-spring-shaped element. These properties of the device in accordance with the invention offer the advantage that very high dynamic bandwidths can be obtained using simple servo circuits. The steps in accordance with the invention prevent the movements of the objective along its optical axis for focussing the light beam from influencing the tracking movements under operating conditions when the optical device is used in an optical disc-record player, which minimizes the risk of cross-talk.

The device in accordnce with the invention is particularly suitable for use in a swinging-arm device for recording and/or reading information tracks in an optical disc by means of a radiation beam which has been concentrated to form a radiation spot. Such a swinging-arm device is described in, for example, European Patent Application No. 0074131 U.S. Pat. No. 4,403,316 corresponds.

A suitable embodiment of the invention is characterized in that the annular mount and the leaf-spring-shaped element are constructed as a one-piece injection-moulded product.

The leaf-spring-shaped element and the mount can be manufactured from commercially available plastics, such as acryl butadiene styrene, polycarbonate and polyvinyl chloride.

Another suitable embodiment is characterized in that the leaf-spring-shaped element is interposed between two parallel blade springs which support the objective, the end of the leaf-spring-shaped element which is remote from the mount being secured between the blade springs.

Figure 2:
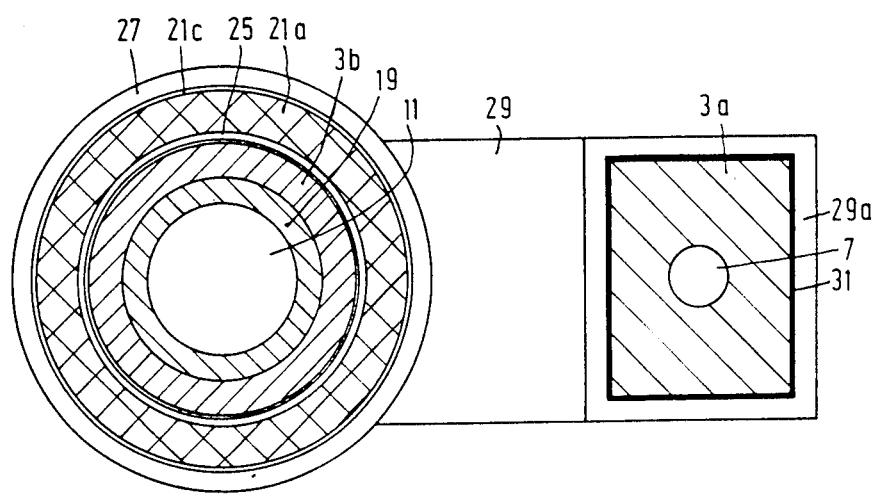

The invention will now be described in more detail, by way of example, with reference to the drawing, in which FIG. 1 is a longitudinal sectional view of an optical focussing device in accordance with the invention and FIG. 2 is a sectional view taken on the lines II—II in FIG. 1.

The optical focussing device shown in FIGS. 1 and 2 may be used in, for example, an audio-disc player provided with a swinging-arm construction as described in the aforementioned European Patent Application No. 0074131.

The optical device in accordance with the invention comprises a frame 1 which comprises two blade springs 3 and 5 provided with moulded-on plastics fixing members 3a and 5a, respectively, arranged on each other. The fixing members 3a and 5a are each formed with a central opening 7 for fitting a mounting, not shown, for example a screwthreaded mounting for securing the frame to a partly shown swinging arm 9 of an optical disc-record player.

The two blade springs 3 and 5 serve as guide means for the axial movement of an objective 11 with an optical axis 13. The objective 11 is axially movable in order to focus a light beam 15 on a rotating audio disc 17. The objective 11 is mounted in a holder 19 which is secured to cylindrical moulded-on portions 3b and 5b of the blade springs 3 and 5.

The objective 11 is actuated by an electromagnetic actuating system comprising first actuating means which comprise an annular magnet 21 and second actuating means which comprise a coil 23. The coil 23 is arranged around the holder 19 of the annular objective 11 on a coil former 22 which is situated between said portions 3b and 5b. The current input and output leads 23a of the coil 23 are arranged in slots 5b1 of the portion 5b and have been soldered to the blade spring 5. In the drawing only one lead 23a is visible. The blade spring 5, which also serves as current input and output conductor, is made of an electrically conductive material such as copper and comprises two longitudinally spaced parts forming two blade-spring portions which are electrically insulated from one another.

The annular magnet 21, which may be made of samarium-cobalt, is arranged concentrically around the objective 11 and comprises two permanent-magnet portions 21a and 21b which are axially magnetized in such a way that two like magnetic poles face each other, as is shown in, for example, FIG. 1. A soft-iron ring 21c is interposed between the two magnet portions 21a and 21b. The annular magnet 21 cooperates with a coil 23 via a substantially homogeneous permanent-magnetic field in the air gap 25. The magnet 21 is secured in an annular mount 27 which is integral with a leaf-spring-shaped element 29 of acryl butadiene styrene. The element 29 is slightly elastic, so that the annular magnet 21 is axially movable to a limited extent, and it also has damping properties, so that the axial forces exerted on the frame by the comparatively heavy annular magnet are damped and no impermissible vibrations are transmitted to the frame. The leaf-spring-shaped element 29 is clamped between the two blade spring portions 3a and 5a at the rectangular end 29a which is remote from the mount 27 and is secured to the blade-spring portion 3a by means of an adhesive material 31.

What is claimed is:

1. An optical device comprising
an axially movable objective with an optical axis,
a frame carrying guide means for the axial movements of the objective, and
an electromagnetic actuating device for the objective, which actuating device comprises first actuating means which are supported resiliently on the frame and which are arranged concentrically around the objective, and second actuating means which are connected to the objective and which are spaced from the first actuating means by an annular gap characterized in that
the first actuating means are in an annular mount which is secured to the frame by a leaf-spring-shaped damping element.

2. An optical device as claimed in claim 1, characterized in that the annular mount and the leaf-spring-shaped element are constructed as a one-piece injection-moulded product.

3. An optical device as claimed in claim 1, characterized in that the leaf-spring-shaped element is interposed between two parallel blade springs which support the objective, the end of the leaf-spring-shaped element which is remote from the mount being secured between the blade springs.

4. An optical device as claimed in claim 2, characterized in that the leaaf-spring-shaped element is interposed between two parallel blade springs which support the objective, the end of the leaf-spring-shaped element which is remote from the mount being secured between the blade springs.

5. An optical device as claimed in claim 3, characterized in that at their ends which are remote from the objective the blade springs are provided with a moulded-on fixing portion to which the leaf-spring-shaped element is secured.

* * * * *